(12) United States Patent
Dubs

(10) Patent No.: US 6,776,882 B2
(45) Date of Patent: Aug. 17, 2004

(54) METHOD FOR PRODUCING A HYBRID DISK AND HYBRID DISKS

(75) Inventor: Martin Dubs, Maienfeld (CH)

(73) Assignee: Unaxis Balzers Aktiengesellschaft, Furstentum (LI)

(*) Notice: Subject to any disclaimer, the term of this patent is extended or adjusted under 35 U.S.C. 154(b) by 0 days.

(21) Appl. No.: 10/037,190

(22) Filed: Nov. 9, 2001

(65) Prior Publication Data

US 2002/0142099 A1 Oct. 3, 2002

Related U.S. Application Data

(63) Continuation of application No. PCT/CH00/00249, filed on May 5, 2000.

(30) Foreign Application Priority Data

May 14, 1999 (CH) ................................. 921/99

(51) Int. Cl.$^7$ ............................. C23C 14/34; B05D 1/36
(52) U.S. Cl. ............................. 204/192.23; 204/192.12; 427/402
(58) Field of Search ..................... 204/192.12, 192.16, 204/192.23, 192.26; 427/401

(56) References Cited

U.S. PATENT DOCUMENTS

| | | | |
|---|---|---|---|
| 5,450,380 A | 9/1995 | Toide et al. ............. | 369/275.5 |
| 5,965,228 A | 10/1999 | Kugler ..................... | 428/64.1 |
| 6,017,603 A * | 1/2000 | Tokuda et al. ............. | 428/64.1 |

FOREIGN PATENT DOCUMENTS

| EP | 0 467 705 A1 | 1/1992 | ............ G11B/11/10 |
|---|---|---|---|
| EP | 0 516 178 A3 | 12/1992 | ............ G11B/7/24 |
| EP | 0 762 406 A1 | 3/1997 | ............ G11B/7/24 |
| EP | 0 834 874 A2 | 4/1998 | ............ G11B/7/24 |

OTHER PUBLICATIONS

Thin Film Processes, Vossen et al., pp. 48–49 (1978).*
Patent Abstracts of Japan—Publication No. 07141696—Publication Date Feb. 6, 1995—Applicant: Pioneer Electron Corp.—Inventor: Matsui Fumio.

* cited by examiner

*Primary Examiner*—Steven VerSteeg
(74) *Attorney, Agent, or Firm*—Notaro & Michalos P.C.

(57) ABSTRACT

Method for producing hybrid disks has a first substrate that is transparent in a given spectral band. A layer system that is semi-transparent in the given band succeeds the first substrate and is followed by a further substrate that is transparent in the given band. Next, is a reflection layer system which is in the semi-transparent layer system and is deposited by a vacuum coating method of identical type. The first substrate is covered by a moisture protection layer system that is transparent in the given spectral band and has at least one layer deposited by a vacuum coating method of identical type.

17 Claims, 1 Drawing Sheet

METHOD FOR PRODUCING A HYBRID DISK AND HYBRID DISKS

This is a continuation of International application No. PCT/CH00/00249, filed May 5, 2000.

FIELD AND BACKGROUND OF THE INVENTION

The present invention relates to a method for producing hybrid disks, with a first substrate transparent at a given spectral band, as well as, succeeding it, a layer system semi-transparent in said band, further, again succeeding it, a further substrate transparent in said band and lastly, again succeeding it, a reflection layer system.

Reference is made to the documents found within the scope of the International Search, specifically:

EP 0 516 178 (JP 4353641)
EP 0 762 406 (U.S. Pat. No. 5,965,228; WO 9709715; JP 9265659)
JP 0714696 (Patent Abstract of Japan Vol. 1995, No. 09, 31 October 1995)
EP 0 467 705 (U.S. Pat. No. 5,490,131; JP-4364248)
U.S. Pat. No. 5,450,380
EP 0 834 874, without any assessment of their significance for the present invention.

In FIG. 1 is schematically represented the conventional structure of a hybrid disk, also known as Super Audio CD. The disk comprises a first transparent substrate 1 whose one face $A_1$ is disposed on the outside against ambient atmosphere. At its second face $A_{1/2}$, disposed on the inside, a semi-transparent layer system 2 is provided which, in turn is in contact with its inner face $A_{2/3}$ on an adhesive substance layer 3. The inner face $A_{3/5}$ of the adhesive substance layer is in contact on a further transparent substrate 5, whose inner face $A_{5/6}$ is in contact on a reflection layer system 6. The latter is conventionally protected against the ambient atmosphere by a protective layer 8, for example a protective lacquer.

In the proximity of face $A_{1/2}$ an informational engraved data pattern is provided, a second in the proximity of face $A_{5/6}$. Laserlight L within a predetermined spectral band, conventionally in the range between 600 nm and 800 nm, in particular between 630 nm and 780 nm, is applied onto the disk for reading out the data, as schematically represented in FIG. 1. Said data is read out, for one, from the reflected partial beam from the semi-transparent layer 2, for another, on the partial beam reflected on the reflection layer system. Either a single laser beam is employed for reading out the entire information, which subsequently is divided at the semi-transparent layer 2, or two different laser beams are employed with specific wavelengths in said spectral band.

Within the scope of the present invention the structural formation of such hybrid disks is essential, and not the technique of reading out or applying the data; both are known.

It is evident and it is essential within the scope of the present invention, that the layering formation of the disk is asymmetric; while, on the one hand, the substrate face $A_1$ is at ambient atmosphere, on the other hand, a layer system, be that a protective layer 8, be that the reflection layer system 6, is at ambient atmosphere.

Substrate materials, which are employed for said disks, such as for example polycarbonate, when uncoated absorb relatively rapidly moisture from the environment. Thus, as readily evident in FIG. 1 and indicated with arrows F, an expansion of the outer substrate 1 results, wherewith the disk similar to bimetals according to FIG. 1 bends concavely upwardly. When lowering the ambient air humidity said substrate 1 contracts, the disk bends according to the representation of FIG. 1, concavely downwardly.

This deformation is characterized by the so-called radial deviation. It is defined as the angular deviation of a beam reflected by the substrate face $A_1$ and for the DVD standard (DVD: Digital Video Disk) must not exceed ±0.8°. But heating to 30° at a relative air humidity of 95% causes a change of the radial deviation of about 1.2°.

It is in principle known to protect substrates of storage disks against moisture by means of a moisture protection layer. Therein coating methods are employed for applying this moisture protection layer, which do not fit into the production cycle of hybrid disks, since they replace, for example, protective lacquering or vacuum coating techniques, which differ fundamentally —in particular also regarding the coating times—from those which are employed for depositing the remaining layer systems on the hybrid disk. The following types of vacuum coating methods are differentiated:

Sputtering, therein reactive or non-reactive with all known electric supplying techniques, namely DC supply, AC+DC supply, AC supply or pulsed DC supply, each magnetic field-supported or not.

Arc evaporation by utilizing a low-voltage high-current arc discharge, through which target material is fused at the migrating base point (ARC Evaporation), again reactive or non-reactive, magnetic field-affected or not.

Thermal evaporation, such as electron beam evaporation, reactive or non-reactive.

CVD methods, in which material is deposited out of the gas phase without plasma enhancement, plasma polymerization.

PE-CVD methods are basically called mixed methods, in which, such as for example in reactive sputtering, plasma-enhanced coating materials are deposited out of the gas phase.

If, within the scope of the present description the same type of vacuum coating methods are mentioned, the above listed types are addressed.

SUMMARY OF THE INVENTION

Under a first aspect of the present invention it is the task of providing a method of the above described type, which can be integrated simply into existing fabrication cycles for hybrid disks.

In the method of the type described in the introduction, in which the semi-transparent layer system as well as the reflection layer system is deposited with a vacuum coating method of the same type, this first task is solved according to the invention thereby that over the first substrate is deposited a moisture protection layer system transparent in said spectral band, in particular in the spectral band of 600 nm to 800 nm, comprised of at least one layer with a vacuum coating method, which, again, is of the same type.

If it is taken into consideration that the hybrid disks are fabricated in an in-line sequence of coating cycles, as for the deposition of the semi-transparent layer system and of the reflection layer system, it is evident that with respect to the installation configuration as well as also with respect to the clock control significant advantages are gained if the procedure as proposed is carried out.

According to prior known techniques, moisture protection layers are furthermore deposited onto storage disks with methods which required, for example, several treatment steps, which can only be automated and mastered with relative difficulties, such as for example through heat treatment, subsequently fluid coating, spin coating etc. or, for example, by means of plasma pretreatment, coating, subsequently heat treatment, to mention some examples.

Under a second aspect thus the present invention is based on the task of providing a method of the type described in the introduction, in which said moisture-caused problems, bending of the disk, are solved highly efficiently and so that they are relatively simply automatable and masterable.

For this purpose, the method described in the introduction is distinguished thereby that over the first transparent substrate a moisture protection layer system, transparent in said spectral band comprising at least one layer, is applied by sputtering.

Under a third aspect of the present invention the invention poses the task of solving said moisture-caused bending problems as efficiently as feasible.

This is solved in the method described in the introduction thereby that over the transparent substrate a moisture protection layer system is deposited comprised of at least one layer of substoichiometric silicon oxide and/or of at least one layer of silicon oxinitride.

Preferably at least two of said solutions, thus, application of a coating method already used for the disk production method, deposition of a moisture protection layer system by sputtering, deposition of a moisture protection layer system of substoichiometric silicon oxide and/or of silicon oxinitride, are applied at least combined in pairs or, in combination, all three aspects.

In order to prevent that by applying said moisture protection layer system onto the substrate face $A_1$ according to FIG. 1, considerable laser signal losses through reflection on the substrate front side must be accepted, it is further proposed that the index of refraction of the material or of the materials of the moisture protection layer system is selected to be maximally identical to the index of refraction of the material of the first transparent substrate, therein in particular said index of refraction n is selected in the range $$1.47 \leq n \leq 1.7,$$

therein preferably in the range $$1.5 \leq n \leq 1.6,$$

in particular preferred $$n \leq 1.57$$

taking into consideration conventional substrate materials, such as for example polycarbonate with an index of refraction $n_s=1.57$.

In order to minimize furthermore the absorption losses generated by application of the moisture protection layer system, it is proposed to select as material or as materials of the moisture protection layer system a material having an extinction constant k for which applies:

$$10^{-4} \leq k \leq 5 \times 10^{-3},$$

therein preferably $$k \leq 10^{-3}.$$

If the moisture protection layer system is deposited by sputtering, then preferably by reactive sputtering of a silicon target in an atmosphere containing oxygen.

To produce a silicon oxinitride layer, nitrogen is additionally employed as a reactive gas. Relatively high fractions of nitrogen are required in the reactive gas mixture in order to change significantly the stoichiometry of the layer. Adding nitrogen to the reactive gas increases, in addition, the stability of the sputtering process, since poisoning the target by oxygen is decreased. In addition, the uniformity of the coating is also improved, which makes possible the deposition of relatively thin layers with identical effect. It is entirely possible to realize the moisture protection layer system through deposition staggered in time of silicon oxide and of silicon oxinitride, optionally with flowing transition, through the corresponding control of the composition of the reactive gas.

In the preferred deposition of the moisture protection layer system of substoichiometric silicon oxide and/or of silicon oxinitride, it is further preferably proposed to employ this with a thickness of minimally 10 nm and, preferably, of maximally 50 nm.

Maintaining said optical constants n and k with the use of substoichiometric silicon oxide as the material of the moisture protection layer system is realized by the precise maintenance of a desired stoichiometry x/y on the $Si_xO_y$ layer, which is preferably monitored by following the coating process by means of a plasma emission monitor and/or by measuring the partial pressure of the reactive gas and, with corresponding measured values as instantaneous values, the coating process is controlled or regulated, for example by manual or preferably by automatic intervention for example into the discharge current and/or voltage and/or reactive gas flow.

When using $O_2/N_2$ reactive gas mixtures for the silicon oxinitride layer, the adjustment of the refractive index via the mixing ratio and the adjustment of the reactive gas flow is even possible without monitoring and regulation of these parameters (target voltage, partial pressure of the reactive gas).

An especially suitable coating method of the type sputtering is DC sputtering, such as in particular magnetron sputtering. Due to the electric insulation properties of the materials applied as moisture protection layer system, such as preferably and in particular of the substoichiometric silicon oxide and/or silicon oxinitride, in the case of DC sputtering, measures against the known so-called "arcing" should be taken, measures which prevent that, due to an insulation coating on the conducting target material, an electrical interference spark formation occurs. This is solved in particular with the application of said substoichiometric silicon oxide and/or silicon target and/or thereby that between a DC generator supplying the sputtering source and the sputter source a current circuit is provided which is intermittently switched high- and low-ohmic. With respect to this technique reference is made to the full extent to EP-A 564 789 by the applicant.

A further variant of preventing said arcing is to carry out the sputter coating intermittently in the same reactive process atmosphere from at least two provided targets, in particular from concentric ring targets.

Furthermore, the moisture protection layer system deposition becomes considerably simplified thereby that the hybrid disk workpieces can also be retained stationarily during the respective coating method with respect to the coating source. This facilitates considerably the loading and unloading of the workpieces at the associated coating process stations.

A hybrid disk with a first substrate transparent in a given spectral band, succeeding it a layer system semi-transparent in the given band, succeeding it a further substrate transparent in the given band, and, furthermore succeeding it, a reflection layer system, comprises between the first substrate and ambient atmosphere a layer system comprised of substoichiometric silicon oxide and/or silicon oxinitride.

BRIEF DESCRIPTION OF THE DRAWINGS

In the following the invention will be described in conjunction with further Figures as well as a preferred embodiment example.

DESCRIPTION OF THE PREFERRED EMBODIMENTS

Figure 1:
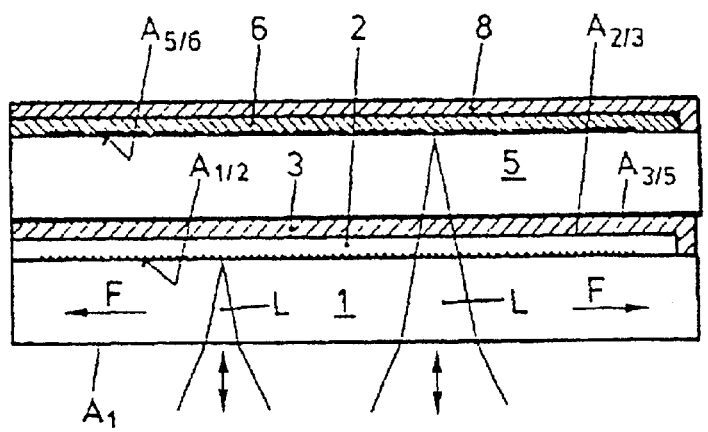
FIG. 1 is a sectional view of a disk made in accordance with the invention.
Figure 2:
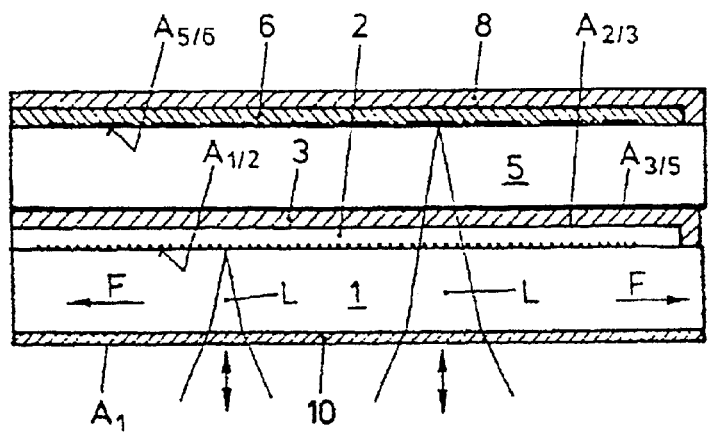
FIG. 2 is a representation analogous to FIG. 1, schematically showing a section of a hybrid disk according to the invention.

In FIG. 2 is depicted the section of a hybrid disk according to FIG. 1 with the same reference symbols, but further developed according to the present invention. As was already described extensively in the introduction, over the face $A_1$ of the first substrate 1 according to the invention, the moisture protection layer system 10 is provided, deposited according to the invention or comprising the material according to the invention. It is superfluous to repeat here, and due to the explanations regarding the present invention already provided in the introduction, the invention in view of FIG. 2.

Hybrid disks comprising two substrates 1 or 5 according to FIG. 2 with a thickness of 0.6 mm each coated with the semi-transparent layer system 2 and the reflection layer system 6 and —3—adhered. The face $A_1$ was with different layer thicknesses coated with stoichiometric $SiO_2$ or substoichiometric $SiO_x$ with x <2. The layers were applied by means of reactive DC sputtering—magnetron sputtering—from metallic silicon in an atmosphere containing oxygen. On a commercially available installation SDS131 of the applicant the following process conditions were set:

| | |
|---|---|
| sputtering power: | 3 kW |
| argon flow: | 30 sccm |
| reactive gas: | $O_2$ with a flow adjusted to between 45 sccm for substoichiometric layers and 50 sccm for stoichiometric layers. |

A magnetron sputter source ARQ131 of the applicant with moving magnet system was applied to attain a maximally uniform target erosion.

To avoid the above described arcing, between a DC generator for the magnetron supply and the magnetron source terminals was employed a current circuit or parallel chopper switched intermittently high- and low-ohmic.

A coating rate of 8.7 nm/sec was obtained which for the preferably used layer thickness of 20 to 50 nm yields a coating time of approximately 2.5 to approximately 6 sec. Layers are obtained with n=1.65; k=0.002 for substoichiometric silicon oxide or
n=1.47; k=0.0002 for stoichiometric silicon dioxide.

The coated hybrid disks were subsequently subjected to a climate test:

From a starting state corresponding to 20° C. ambient temperature and approximately 40% relative air humidity, the hybrid disks were stored for 24 h at an ambient temperature of 50° C. and a relative air humidity of approximately 95%.

Figure 3:
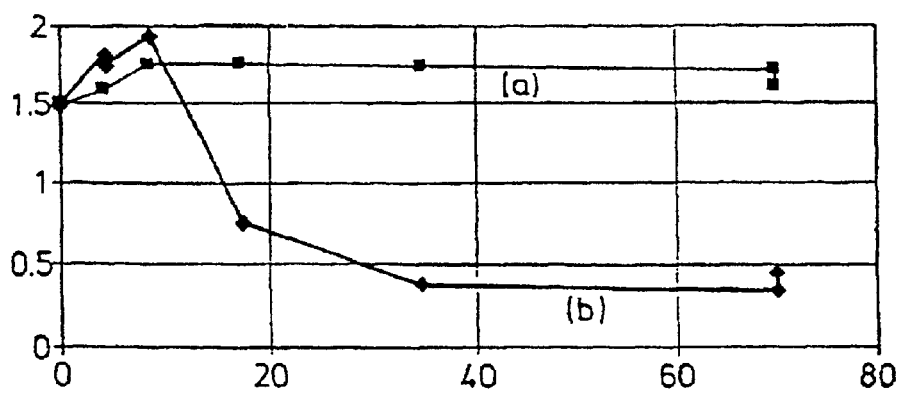
FIG. 3 is a graph of a function of the deposited moisture protection layer thickness the resulting radial deviation on a hybrid disk with a protection layer comprised of stoichiometric silicon dioxide (a) or substoichiometric silicon oxide (b).

The test results are compiled in FIG. 3. It is readily evident that, similar to hybrid disks without moisture protection coating system, hybrid disks with a stoichiometric $SiO_2$ coating, due to the test condition and due to water absorption, bend by 1.5 to 2° of radial deviation. In the case of hybrid disks, which are coated with substoichiometric silicon oxide, a highly relevant reduction of this radial deviation, as a function of the layer thickness, of up to a factor or more than 3 resulted. Comparable good results are obtained with the deposition of the moisture protection layer system of silicon oxinitride. Therein as the reactive gas a gas mixture of $O_2/N_2$ is employed and the optical constants adjusted through the ratio of the reactive gas mixture or the partial pressures.

It is further evident that the far preferred coating materials, namely substoichiometric silicon oxide or silicon oxinitride, entail further significant advantages:

With temperature changes the hybrid disks expand and in particular the substrates 1 and 5, therewith also substrate 2 according to FIG. 2. Thus the coefficient of thermal expansion of polycarbonate α as a material customarily employed as a substrate is $65 \times 10^{-6}$/K. The stresses resulting in the moisture protection layer system are proportional to the modulus E of elasticity of the layer material. Stoichiometric silicon dioxide has a modulus E of about 30 to 100 Gpa, the modulus E of polycarbonate is 2 to 2.5 Gpa. The stoichiometric silicon dioxide is highly brittle and easily develops cracks through which, independent of the layer material, moisture penetrates to the substrate.

Substoichiometric silicon oxide or silicon oxinitride has significantly better mechanical properties, i.e. a considerably lower modulus of elasticity E and a considerably higher breaking elongation compared with stoichiometric silicon dioxide. As has been shown, said preferred materials can be deposited simply by reactive sputtering of silicon targets with high deposition rate. With the aid of optionally monitored process operation therein the stoichiometry is adjusted such that the refractive index of the substoichiometric silicon oxide or silicon oxinitride is within the required range. In this spectral range the substoichiometric silicon oxide or the silicon oxinitride, also substoichiometric, which, with respect to the refractive index, meets said requirements is virtually also absorption-free.

Since in contrast to the stoichiometric silicon dioxide the substoichiometric silicon oxide or silicon oxinitride tends to the formation of cracks to a significantly lower degree, a virtually water-tight efficient protective barrier is formed on the substrate, and specifically even starting from the minimally specified layer thicknesses of 10 nm. The sputtering times required for the deposition of 2.5 to 6 sec. are well within the time window, which is required for sputter coating of the reflection layer system as well as also of the semi-transparent layer system. It must be emphasized that the semi-transparent layer system is preferably deposited by reactive silicon sputtering, sputtering, such that it is even possible to carry out both coatings, namely semi-transparent layer system and moisture protection layer system, at one and the same sputtering station.

Since, furthermore, the optical and mechanical properties of the moisture protection layer system, in particular with the preferred use of substoichiometric silicon oxide, depend strongly on the exact maintenance of a desired stoichiometry ratio, it is, as has been stated, advisable to monitor the coating process.

This can take place by means of a plasma emission monitor, for example by measuring the intensity ratio of oxygen and argon plasma emission lines, or by measuring color changes of the plasma of or by monitoring the reactive gas partial pressure by means of a mass spectrometer, and in situ regulation of the process by adjustment intervention in particular into the reactive gas flow, optionally the electric discharge parameters. If constancy is ensured of the process parameters set over a sufficiently long time, the drift of these parameters and therein the drifting of stoichiometry ratios during the measurement of the refractive index on fabricated moisture protection layers, for example by means of ellipsometer and/or absorption measuring, can take place after the coating with corresponding corrective intervention regarding the process.

During the also preferred deposition of silicon oxinitride, a corresponding monitoring of the process can even be omitted due to the high process stability.

Through the procedure according to the invention, on the one hand, the fabrication time of hybrid disks is not extended or only insignificantly so; the coating process preferred according to the invention can be readily automated, can be readily mastered and can be extremely well integrated into the coating methods which are in any event preferably employed in the production of the hybrid disks. In particular by using substoichiometric silicon oxide and/or of substoichiometric silicon oxinitride as the material for the moisture protection layer system, the specifications for the radial deviation of such disks are readily maintained. Furthermore, the preferably used materials can be realized by the use of nonpoisonous cost-effective raw materials, namely of silicon, oxygen and nitrogen. But it must be emphasized that, in particular when for the deposition of other layer systems on hybrid disks, namely of the semitransparent layer system and of the reflection layer system, other methods of a type different from sputtering are applied, for example CVD or plasma polymerization, within the scope of the present invention no longer sputtering but rather, as stated, said coating method type is preferably also employed for the deposition of the moisture protection layer system.

If the preferably used materials, namely silicon oxide and silicon oxinitride, are addressed here, this should be understood that it is entirely possible for further elements to be present, for example in a compound $SiO_xN_yR_z$ in the case of silicon oxinitride, wherein z is small, even very small, compared to x and y.

What is claimed is:

1. A method for manufacturing a storage disk having an asymmetric layering formation, the method comprising the steps of:

providing a first substrate (1) that is transparent in a given spectral band;

applying to a first side of said first substrate an arrangement of layers including a reflection layer system (6); and applying to a second side of said substrate a protection layer system for protecting said second side from ambience, said protection layer system comprising at least one layer of at least one of silicon oxinitride and substoichiometric silicon oxide.

2. The method of claim 1, further comprising the steps of applying said arrangement, including said reflection layer system (6), by:

applying a layer system (2) which is semitransparent in said spectral band;

applying a second substrate (5) that is transparent in said spectral band; and applying said reflection layer system (6).

3. The method of claim 2, further comprising the step of applying at least one layer of said semitransparent layer system, at least one layer of said reflection layer system and said at least one layer of said protection layer system by a vacuum coating process.

4. The method of claim 2, further comprising the step of depositing at least one layer of said semitransparent layer system and at least one layer of said reflection layer system, as well as said at least one layer of said protection layer system, by sputtering.

5. The method of claim 1, further comprising the step of applying at least one layer of said reflection layer system and said at least one layer of said protection layer system with a vacuum coating process.

6. The method of claim 1, further comprising the step of depositing at least one layer of said reflection layer system and said at least one layer of said protection layer system by sputtering.

7. The method of claim 1, further comprising the step of selecting the refractive index of material of said at least one layer of said protection layer system to be equal to the refractive index of a material of said first transparent substrate.

8. The method of claim 1, further comprising the step of selecting the refractive index n of said at least one layer of said protection layer system as follows: $1.47 \leq n \leq 1.7$.

9. The method of claim 8, further comprising the step of selecting: $1.5 \leq n \leq 1.6$.

10. The method of claim 1, further comprising the step of selecting the refractive index n of said at least one layer of said protection layer system to be at most 1.57.

11. The method of claim 1, further comprising the step of selecting the extinction constant k of said at least one layer of said protection layer system to be $10^{-4} \leq k \leq 5 \times 10^{-3}$.

12. The method of claim 1, further comprising the step of selecting the extinction constant k of said at least one layer of said protection layer system to be at most $10^{-3}$.

13. The method of claim 1, further comprising the step of depositing said at least one layer of said protection layer system by reactive sputtering of a silicon target.

14. The method of claim 1, further comprising the step of depositing said protection layer system with a thickness of at least 10 nm.

15. The method of claim 1, further comprising the step of depositing said protection layer system with a thickness of at least 50 nm.

16. The method of claim 1, wherein said at least one layer of said protection layer system comprises substoichiometric silicon oxide.

17. The method of claim 1, wherein said at least one layer of the protection layer system comprises silicon oxinitride.

* * * * *